(No Model.)

J. A. McCORMICK.
PIPE COUPLING.

No. 318,009. Patented May 19, 1885.

Witnesses
W. C. Chaffee
H. C. Rawlings

Inventor
Junius A. McCormick
By Connolly Bros & McSyphe
Att'ys

UNITED STATES PATENT OFFICE.

JUNIUS A. McCORMICK, OF PITTSBURG, PENNSYLVANIA.

PIPE-COUPLING.

SPECIFICATION forming part of Letters Patent No. 318,009, dated May 19, 1885.

Application filed March 21, 1885. (No model.)

*To all whom it may concern:*

Be it known that I, JUNIUS A. McCORMICK, of Pittsburg, in the county of Allegheny and State of Pennsylvania, have invented certain new and useful Improvements in Pipe-Couplings; and I do hereby declare that the following is a full, clear, and exact description of the invention, which will enable others skilled in the art to which it appertains to make and use the same, reference being had to the accompanying drawings, which form a part of this specification.

This invention has for its object a form of coupling for pipes used for the conveyance of aeriform fluids under pressure—such as gas, steam, or natural gas, the last, especially, as it has been found difficult to restrain the pressure to such an extent as to preclude leakage at the pipe-joint.

So far as I am aware, all joints heretofore specially proposed have been based on some one of the principles of mechanical compression or friction by means of compress rings, flanges, or sleeves mechanically acting upon some form of packing or gasket. My invention differs radically from any such principle, and is based upon the result of the fluid-pressure in the pipe itself acting upon a suitable packing material.

It consists in subjecting suitable packing material in a properly-designed chamber to the direct pressure of the fluid in the pipe in such a manner as to cause the said pressure to exert a compressing tendency upon the packing material, and thus seal the joint between the pipe and the coupling-sleeve.

The invention further comprises a pipe-coupling wherein the adjacent pipe ends are separated within a sleeve chambered to receive and retain a packing material having a surface so exposed to the pressure of the fluid in the pipe that the pressure of said fluid is exerted to hold the packing tightly around the pipe. The invention still further comprises a pipe-coupling wherein the packing is a fluid of a liquid, semi-liquid, or viscous character adapted to be held in position by the pressure of the fluid passing through the pipe, and, finally, in the construction and arrangement of parts, substantially as hereinafter fully described and claimed.

Figure 1:
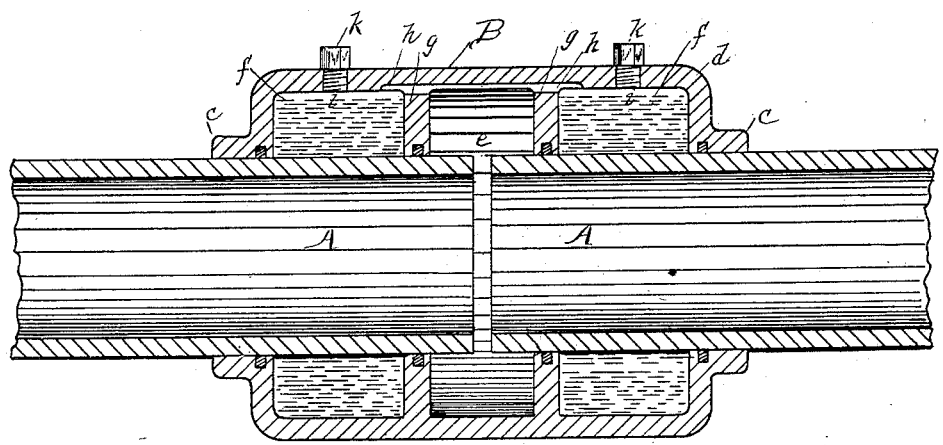
Figure 2:
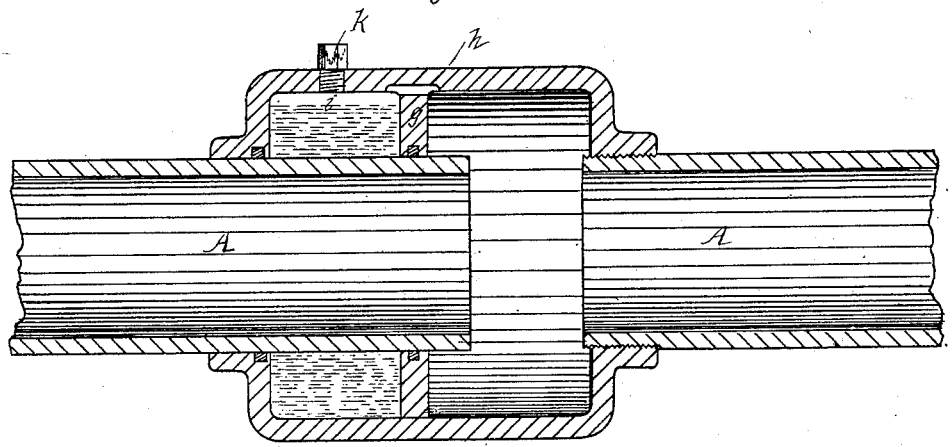
Figure 3:
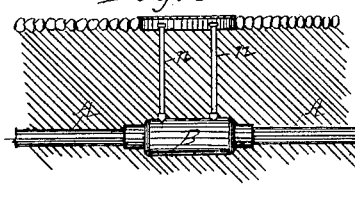

In the drawings, Figure 1 is a longitudinal section of one form of my invention. Fig. 2 is a similar view of a modification; and Fig. 3 is a view showing the arrangement for replenishing the packing from time to time, if necessary. The preferred form is shown in Fig. 1.

A A are the adjacent sections of pipe, which in this case are smooth and unthreaded externally, as this coupling is designed to permit free expansion and contraction of the pipe-line. I insert these into the respective ends of the sleeve B, which comprises the neck *c* (which merely suffer the pipes A to be inserted) and the enlargement *d*, having the central annular chamber, *e*, and the similar annular chambers, *f*, with the interposed walls *g*, whose inner periphery also closely fits the pipe A. Ports *h* open from chamber *e* into chambers *f* at the top of the latter. In the wall of the sleeve B, I make the openings *i*, which I fit with screw-plugs *k*, as shown.

In placing the sleeve B in position the season or temperature will determine the amount of separation to be allowed between the adjacent ends of pipes A A. They are placed close together in summer or hot weather, while they will be set some distance apart if laid during cold weather. After the setting of sleeve B, I remove plugs *k* and pour into the chambers *f* tar, oil, paraffine, or other suitable material, until the same almost fills the said chambers, but not entirely. I then screw down the plugs *k* and the coupling is complete. The fluid-pressure in the pipes A has direct access to the chamber *e*, and from it through ports *h* to the upper surface of the packing material which surrounds the pipe A in chambers *f;* hence the very pressure of the fluid in pipe A itself acts to pack the joint to the full extent of its own pressure, because it exerts its pressure directly on the top of the packing in chamber *f*, and forces it tightly against the pipe A and effectually seals the whole joint. At the same time the pipes A can expand or contract freely.

One of the pipes A may, if desired, be anchored, or the sleeve B may be threaded at one end and one of the pipes A likewise, so that the sleeve may be screwed on permanently to go with the pipe, as shown in Fig. 2.

By this construction there is only one chamber, f, and great facility exists for making connections in short lines where the pipes must be cut off, because there is no threading to be done after cutting off the required length.

As an additional precaution, leather or other gaskets, m, may be applied, in any of the usual forms adapted to the purpose, to the neck c and also to the partitions g, as shown.

To provide for possible evaporation or leakage of the packing material, it may be desirable to replenish it from time to time. For this purpose the plugs k may be replaced by pipes n, rising to a man-hole in the street, for convenient access at any time, as indicated by Fig. 3.

Pipes n may, if desired, be provided with stop-valves to facilitate the admission of the packing material.

Where the pipes A are used for steam the latter, having always direct access to the packing-chambers, would condense enough water to always have them full to the ports h. And in all cases the ports h would form overflows, so that the excess of material would pass into chamber e.

Having described my invention, I claim—

1. A pipe-coupling comprising a sleeve to fit the pipe ends, a pressure-chamber communicating with the interior of the pipe, and one or more annular packing-chambers in communication at their top with said pressure-chamber and adapted to receive a suitable packing material, substantially as described.

2. A pipe-coupling composed of a sleeve to fit the pipe ends, an annular pressure-chamber communicating with the interior of the pipe, and one or more annular packing-chambers communicating with said pressure-chamber at their upper part only, and provided with means for filling with suitable packing material after the insertion of the pipes to be coupled, substantially as described.

3. In a pipe-coupling, the combination, with the pipes A A, of the sleeve B, having necks c, one or more annular sealing-chambers, f, and a pressure-chamber, e, both of said chambers having a communicating port, h, at their upper portion, substantially as described.

4. In a pipe-coupling, the combination, with the pipe ends, of the sleeve B, having necks c, a pressure chamber, e, communicating with the interior of the pipes, and one or more annular sealing-chambers, f, having port h, and substantially filled with a liquid or semi-liquid material, substantially as described.

In testimony that I claim the foregoing as my own I have hereto affixed my signature in presence of two witnesses.

JUNIUS A. McCORMICK.

Witnesses:
T. J. McTIGHE,
A. A. MOORE.